Patented Nov. 23, 1926.

1,608,390

UNITED STATES PATENT OFFICE.

ALFRED S. HALLAND, OF BUFFALO, NEW YORK, ASSIGNOR TO NIAGARA SPRAYER COMPANY, OF MIDDLEPORT, NEW YORK, A CORPORATION OF NEW YORK.

COMPOSITION OF MATTER.

No Drawing. Application filed December 14, 1922. Serial No. 606,968.

This invention relates to a composition of matter and has particular reference to one used for the treatment of vegetation such as trees and plants in order to protect them from the action of vermin and insects.

An object of the invention resides in the provision of a dusting powder or mixture which can be readily stored or shipped without absorbing moisture so that when shipped for use it will be received in a fine powdered condition ready for immediate application.

A further object resides in the provision of a composition which, when applied to vegetation will not be affected by the action of moisture or rain which hitherto has washed it off the vegetation before it has had a chance to take effect.

A further object resides in the provision of a composition for treating vegetation which includes the use of such chemical ingredients as will enhance the economical production of the compound while yet maintaining its chemical effectiveness and purity to a high degree.

The invention in its general aspects includes the combination with a dusting mixture or powder of an ingredient or ingredients which will enable this powder to be ground very fine so as to increase its efficiency of application to vegetation and at the same time will prevent the tendency of the powder to cake in the container before its use due to the absorption of moisture by the powder. The addition of this same ingredient will also prevent the powder or mixture from being washed off vegetation by rain. The ingredient which is added to the dusting powder or mixture is in general an alkaline earth salt of a fatty acid. These salts have, to a marked degree, the power of shedding water which property they lend to any mixture in a degree approximately proportionate to the percentage of such salts used in the mixture.

In the case of certain powders, it has been shown by experiment that an admixture of the salts up to 20% of the dusting powder used reduces the tendency of the latter to absorb moisture to such an extent that it is possible to grind the powder, which is generally the soluble compound of sulfur formed by the fusion of sulfur with caustic soda or soda ash, fine enough to make it efficient and also to inhibit or delay the tendency of the soluble compound of sulfur formed by the fusion of sulfur with caustic soda or soda ash or the powder to cake in the containers before used.

It is found that by not increasing the contents of the above mentioned salts above a certain percentage that the efficiency of the powder against San José scale will not be lowered.

As an example of several salts which can be used, and which are illustrative of a general group available for use, I refer to barium, strontium and magnesium stearates, oleates and palmitates. These salts are several of a group of alkaline earth salts of the fatty acids which have been found particularly available for the purpose of achieving the objects above mentioned in combination with dusting powders or mixtures.

I have found that calcium stearate with relation to its chemical properties and its commercial availability is the one among others which I prefer to use. This salt is a white powder, very greasy to the touch and very efficient in shedding water. This tendency or property seems to be contributed to the dusting powder or mixture when the calcium stearate is added thereto.

In the preparation of the calcium stearate, I preferably use about 80 lbs. of burnt lime slaked to which is added 20 lbs. of melted stearic acid. A complete absorption of the stearic acid takes place, the mass subsequently being dried and ground. I find that for reasons of commercial economy it is sufficient to use what is known as "single pressed stearic acid." This technical product contains two solid fatty acids, namely stearic and palmitic acid, as well as one fluid fatty acid, namely oleic acid. It is possible to use what is known as "double pressed stearic acid" which contains much less oleic acid, but is much more expensive and in which the technical effect obtained by using it is not commensurate with its high cost.

In mixing the stearic acid with the lime, only about 2 lbs. of the lime are absorbed by the acid. The balance of the lime appears in the finished product as hydrated lime. Consequently the finished salt is approximately 78% of hydrated lime and 22% of calcium stearate. There is, of course, nothing fixed about this particular mixture. The content of stearate may be lowered or raised. The advantage of leaving a large excess of hydrated lime in the mixture is that it insures a product which is easily ground and allows an exceedingly simple manufacturing process. The presence of the hydrated lime is, in most cases, harmless for the purposes for which dusting mixtures are used.

The dusting powders, including the ground soluble compound of sulfur formed by the fusion of sulfur with caustic soda or soda ash, are then mixed with the calcium stearate composition above mentioned up to 20% and the use and application of this composition discloses the above mentioned favorable characteristics which adapt it for efficient use.

What I claim is:—

1. A composition of matter for treating vegetation which includes calcium stearate in pulverulent condition.

2. A composition of matter for treating vegetation which includes calcium stearate in pulverulent condition up to 20% of the composition.

3. A composition of matter for treating vegetation which includes an alkaline earth salt of a fatty acid in pulverulent condition up to 20% of the composition.

4. A composition of matter for treating vegetation which includes a soluble compound of sulfur formed by the fusion of sulfur with caustic soda or soda ash and an alkaline earth salt of a fatty acid in pulverulent condition up to 20% of the composition.

5. A dusting mixture for vegetation which comprises the ground soluble compound of sulfur formed by the fusion of sulfur with caustic soda or soda ash and 20% calcium stearate in pulverulent condition.

6. A dusting mixture which comprises the ground soluble compound of sulfur formed by the fusion of sulfur with caustic soda or soda ash and 20% of alkaline earth salt of a fatty acid in pulverulent condition.

7. A composition of matter for dusting vegetation, which includes the use of 20% of a mixture of 78% hydrated lime and 22% calcium stearate in puverulent condition.

8. A composition of matter for dusting vegetation, which includes the ground soluble compound of sulfur formed by the fusion of sulfur with caustic soda or soda ash and up to 20% of a mixture of 78% hydrated lime and 22% calcium stearate in pulverulent condition.

ALFRED S. HALLAND.